US006349222B1

(12) United States Patent
Hafiz

(10) Patent No.: US 6,349,222 B1
(45) Date of Patent: Feb. 19, 2002

(54) VOICE ACTIVATED MOBILE TELEPHONE CALL ANSWERER

(75) Inventor: Sheikh A. Hafiz, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/241,809

(22) Filed: Feb. 1, 1999

(51) Int. Cl.[7] .................................................. H04Q 7/32
(52) U.S. Cl. ...................... 455/569; 455/568; 455/563; 455/550; 455/567; 455/347; 379/88.01; 379/88.02; 379/88.03; 379/88.04
(58) Field of Search .................................. 455/569, 568, 455/563, 550, 418, 419, 567, 412, 345, 347, 351, 344; 379/88.01, 88.02, 88.03, 88.04

(56) References Cited

U.S. PATENT DOCUMENTS

| 4,320,256 A |   | 3/1982  | Freeman .................... 179/6.04 |
|-------------|---|---------|--------------------------------------|
| 4,348,550 A |   | 9/1982  | Pirz et al. ..................... 179/1 |
| 4,644,107 A |   | 2/1987  | Clowes et al. ............... 379/354 |
| 4,853,953 A |   | 8/1989  | Fujisaki ........................ 379/88 |
| 4,864,622 A |   | 9/1989  | Iida et al. ..................... 381/41 |
| 4,928,302 A |   | 5/1990  | Kaneuchi et al. ............. 379/88 |
| 4,998,291 A | * | 3/1991  | Marui et al. ................ 455/412 |
| 5,007,081 A |   | 4/1991  | Schmuckal et al. ......... 379/354 |
| 5,325,421 A |   | 6/1994  | Hou et al. ..................... 379/67 |
| 5,584,052 A | * | 12/1996 | Gulau et al. .................. 455/79 |
| 5,594,784 A |   | 1/1997  | Velius .......................... 379/88 |
| 5,630,205 A | * | 5/1997  | Ekelund ..................... 455/418 |
| 5,924,046 A | * | 7/1999  | Martensson ................. 455/567 |
| 5,974,333 A | * | 10/1999 | Chen .......................... 455/569 |
| 6,052,603 A | * | 4/2000  | Kinzalow et al. ........... 455/569 |
| 6,085,428 A | * | 7/2000  | Casby et al. ................ 455/569 |
| 6,112,103 A | * | 8/2000  | Puthuff ....................... 455/563 |

FOREIGN PATENT DOCUMENTS

| GB |        2317781 A | * | 4/1998 |
|----|------------------|---|--------|
| WO |    WO 99/03254   | * | 1/1999 |

* cited by examiner

Primary Examiner—William Trost
Assistant Examiner—Keith Ferguson
(74) Attorney, Agent, or Firm—Philip R. Wadsworth; Charles D. Brown; George C. Pappas

(57) ABSTRACT

A mobile telephone system and a method for answering a mobile telephone incoming call by a user's verbal command, to allow hands-free voice. The mobile telephone system includes a carkit and a mobile telephone. The mobile telephone has a programming key for pre-programming the user's voice greeting, a keypad for answering the call in telephone mode, a microphone for entering a user's verbal command for answering the call in carkit mode, a digital processor connected to the microphone for performing spectrum analysis and feature extractions of the user's verbal command in carkit mode, and a memory connected to the digital processor, having a database for storing the user's pre-programmed voice greeting digitized speech pattern. The pre-programmed voice greeting may be a factory-programmed voice greeting or the user's pre-programmed voice greeting, if previously initialized after pressing the programming key. The digital processor performs spectrum analysis and feature extractions of the user's verbal command for determining if a match exists between the user's verbal command and the stored user pre-programmed voice greetings. The digital processor also checks whether the user's verbal command reaches a pre-programmed pass/fail voice threshold level, if a match is confirmed.

17 Claims, 3 Drawing Sheets

FIG. 1
(PRIOR ART)

VOICE ACTIVATED MOBILE TELEPHONE CALL ANSWERER

BACKGROUND OF THE INVENTION

I. Field of the Invention

This invention relates generally to the field of mobile telephones, and more specifically pertains to a voice activated call answerer and a method for hands-free voice activation of a mobile telephone by verbal command.

II. Description of Related Art

When a mobile telephone is turned on in a cellular PCS radiotelephone environment, it typically must search for and acquire the forward link signal (pilot signal), which is continuously transmitted by a base station. The pilot signal is used by the mobile telephone to obtain initial system synchronization and to provide time, frequency and phase tracking of the signals from the base station. Since the mobile telephone cannot start transmitting or receiving until the pilot signal is acquired, this signal must be acquired quickly after the turn on, since the user typically does not want to wait to make a telephone call.

Once the mobile telephone is turned on, it may be used in a vehicle to send or receive telephone calls. In order to allow a driver, who wants to use the mobile telephone, to practice careful driving and pay good attention to the road environment, the mobile telephone is preferably placed in a carkit cradle mounted within the vehicle. Presently, however, answering an analog or digital mobile telephone call has to be started by manually pressing a key on a mobile telephone keypad. There does not appear to be a reliable method and architecture for activation of a mobile telephone by verbal command.

Therefore, there is a need for an efficient voice activated call answerer architecture and a method for hands-free voice activation of a mobile telephone by verbal command.

SUMMARY OF THE INVENTION

The preceding and other shortcomings of currently available mobile phone answering systems are addressed and overcome by the various embodiments of the present invention.

One embodiment of the present invention is a mobile telephone system for answering a mobile telephone incoming call by a user's verbal command, to allow hands-free voice activation. The mobile telephone system includes a carkit and a mobile telephone. The mobile telephone has a programming key for pre-programming the user's voice greeting, a keypad for answering the call in "telephone mode", a microphone for entering a user's verbal command for answering the call in "carkit mode", a digital processor connected to the microphone for performing spectrum analysis and feature extractions of the user's verbal command in carkit mode, and a memory connected to the digital processor, having a database for storing the digitized speech pattern of the user's pre-programmed voice greeting.

The pre-programmed voice greeting may be a factory-programmedvoice greeting or the user's pre-programmed voice greeting, if previously initialized by the user pressing the programming key. The digital processor performs spectrum analysis and feature extractions of the user's verbal command for determining if a match exists between the user's verbal command and the stored user entered pre-programmed voice greetings. If a match is found the digital processor also checks whether the user's verbal command reaches a pre-programmed pass/fail voice threshold level.

Another embodiment of the present invention is a method for allowing a mobile telephone user to answer an incoming call by a verbal command to perform hands-free voice activation. The method may include performing initialization to pre-program a user's voice greeting. If an incoming call is received, the method allows answering the incoming call by a verbal command, to accept or reject the incoming call.

The initialization step prompts and inputs the user's voice greeting, prompts the user and enters a mobile telephone memory database location for storing the voice greeting, and stores the voice greeting represented as a digitized speech pattern in the specified mobile telephone memory database location. The digitized speech pattern may be in compressed or uncompressed form.

When a mobile device is paged to complete a voice call, it goes through the "call answering" process. The call answering process alerts the user to enter a verbal command, and waits for the user's verbal command. If the user answers by a verbal command and if not previously initialized, the method outputs a factory-programmed voice greeting. If the user answers by the verbal command and if previously initialized, the method determines if a match is found of the user's verbal command and the stored user pre-programmed voice greetings, and if a match is found, outputs the matched user preprogrammed voice greeting. After one of the voice greetings is output, the method sends a page response message to the mobile telephone's base station to continue with the incoming call.

The foregoing and additional features and advantages of the present invention will become further apparent from the following detailed description and accompanying drawing figures that follow. In the figures and written description, numerals indicate the various features of the invention, like numerals referring to like features throughout.

DETAILED DESCRIPTION OF THE INVENTION

The following description is provided to enable any person skilled in the art to make and use the invention and sets forth the best modes contemplated by the inventors of carrying out their invention. Various modifications, however, will be readily apparent to those skilled in the art, since the general principles of the present invention have been defined herein with specificity.

The present invention pertains to a device and method for call answering an analog or digital mobile telephone by voice activation. This feature enables users of mobile telephones to enjoy hands-free voice activation, in "telephone mode" or "carkitmode", and to answer incoming telephone calls through verbal commands.

Figure 1:
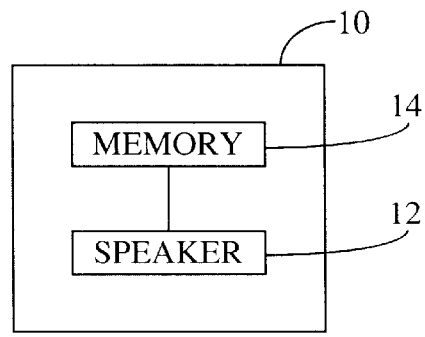
FIG. 1 illustrates a functional block diagram of a conventional carkit.
Figure 2:
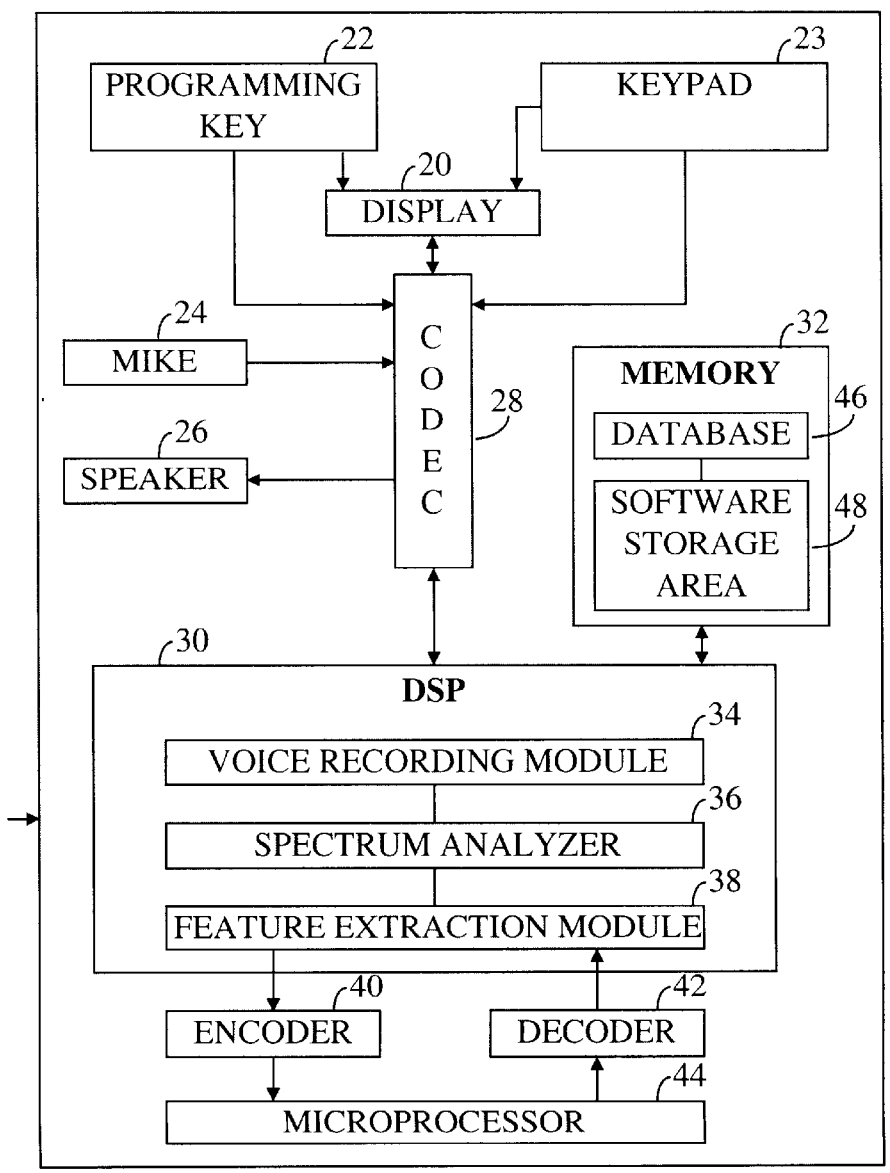
FIG. 2 illustrates a functional block diagram of a mobile telephone, according to one embodiment of the present invention.

A functional block diagram of a carkit is shown in FIG. 1. It is a conventional device having a mobile telephone cradle 10 with a speaker 12 and a memory 14. FIG. 2 illustrates a functional block diagram of a mobile telephone according to an embodiment of the present invention. It has a display 20, a programming key 22 for initiating programming mode, a standard keypad 23, a microphone 24 and a speaker 26. The microphone 24 and the speaker 26 are connected to a speech coder-decoder (CODEC) 28. The speech CODEC 28 consists of an analog-to-digital converter (ADC) and a digital-to-analog converter (DAC), not shown.

The speech CODEC 28 receives input signal from the microphone 24 and outputs signals to the speaker 26. It may also output signals to the speaker 12, when the mobile telephone is in the cradle 10. The analog-to-digital converter receives an analog audio signal as input and converts it into a digital signal. The digital-to-analog converter performs the opposite conversion. The speech coder-decoder (CODEC) 28 either rebuilds specific human language sounds out of the speech blocks received from a conventional channel CODEC, not shown, and passes the digitized speech to the DAC, or compresses digitized speech coming from the ADC so that the data are represented by blocks of bits before being encoded.

The speech CODEC 28 is connected to a digital signal processor (DSP) 30. The DSP 30 is preferably fabricated on a single semiconductor chip. It is used to perform spectrum analysis and feature extractions through digital speech processing, preferably in pulse code modulation (PCM) format. The DSP 30 contains a voice recording module 34, a spectrum analyzer 36 and a feature extraction module 38. The DSP 30 is connected to an encoder 40, a decoder 42 and a memory 32.

The encoder 40 and decoder 42 are connected to a microprocessor 44. The memory 32 has a database 46 and a software storage area 48 used by the method embodiments of the present invention. The memory 32 is preferably a rewritable flash memory on a memory chip which allows stored data to be easily retrieved and overwritten. The database 46 may have separate location areas for storing voice greetings of different users of the same mobile telephone.

The output from the speech CODEC 28 is passed to the DSP 30 to perform the spectrum analysis. The sampled values from the speech CODEC 28 ADC are analyzed in the DSP 30 to extract the power spectral density or speech waveform information from the PCM data. The DSP-analyzed data is filtered in the feature extraction module 38 to eliminate redundant data of natural speech such as pauses between words or syllables.

The analysis of a set of data samples produces filter coefficients and an excitation signal for a conventional time-invariant digital filter, not shown, of the feature extraction module 38. This filter can be regarded as a digital imitation of the human vocal tract, where the filter coefficients represent vocal modifiers (e.g., teeth, tongue, pharynx), and the excitation signal represents the sound (e.g., pitch, loudness) or the absence of sound that is passed through the vocal tract (filter). A correct setting of filter coefficients and an appropriate excitation signal yields a sound typical of the human voice.

The data output from the DSP 30 is encoded in the encoder 40 and the data entering the DSP 30 from the microprocessor 44 is decoded in the decoder 42. The microprocessor 44 is used by the software of the present invention to inform the mobile telephone's base station that the call is answered, and keeps the data representative of whether the call is answered in "telephone mode" or "carkit mode".

Another embodiment of the present invention is a method for allowing a mobile telephone user to answer an incoming call by a verbal command to allow hands-free voice activation. If not previously initialized by the user's voice greeting, the method allows an initialization of the present invention to be performed, to pre-program the user's voice greeting. If an incoming call is received, the method allows a user to answer the incoming call by a verbal command, and allows the user to accept or reject the incoming call. The initialization mode method embodiment of the present invention is performed by a computer program stored in the software storage area 48.

Figure 3:
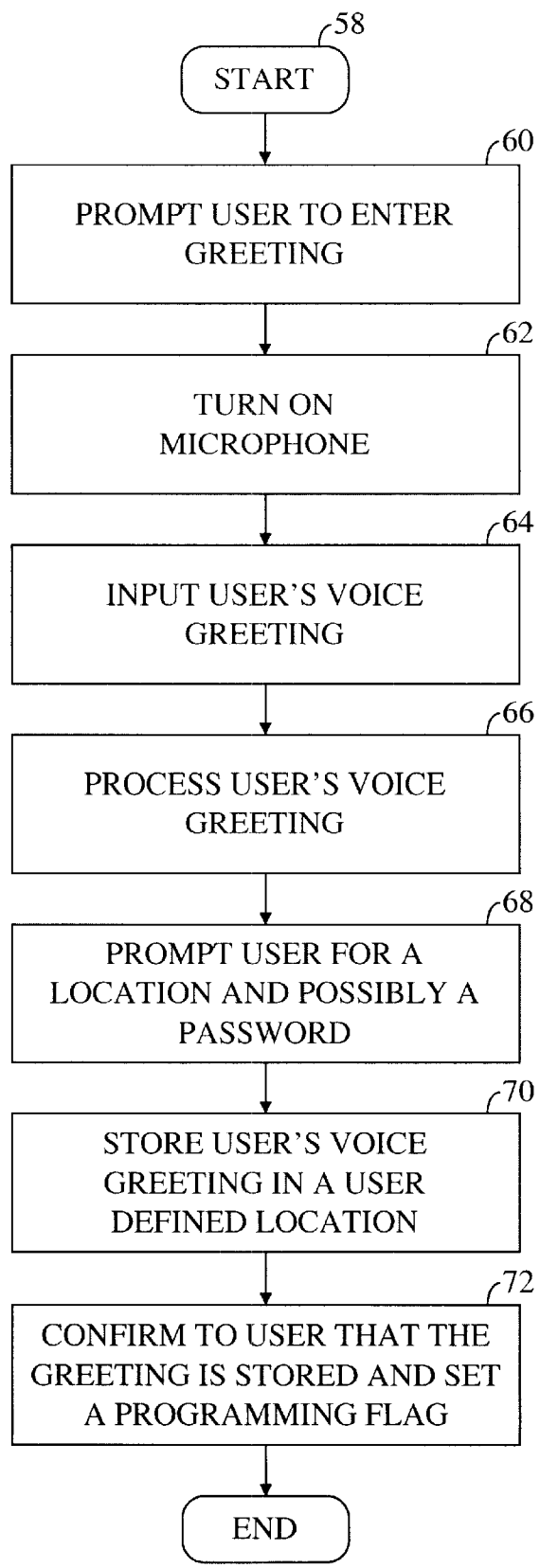
FIG. 3 illustrates a flow chart of an initialization mode method used to pre-program a user's voice greeting, according to another embodiment of the present invention.

FIG. 3 represents a flow chart of the initialization method program, used by the user to pre-program a voice greeting. The voice greeting may be represented in the memory database 46 as a compressed or uncompressed digitized speech pattern. The method of the initialization mode is started at step 58 by pressing the programming key 22 of the mobile telephone. Step 60 includes prompting the user with a beep to enter the voice greeting. The microphone 24 is then turned on in step 62.

Step 64 includes inputting the user's voice greeting. The voice greeting is processed in step 66 in the voice recording module 34 of the DSP 30 and displayed on the mobile telephone display 20. When processing is completed the voice greeting is obtained, and the user is prompted in step 68 to select and enter a memory location and possibly a password for storing the voice greeting. In step 70 the voice greeting and the password are stored in the specified location of memory database 46. A programmed status flag is set in step 72 and a confirmation is displayed on the mobile telephone display 20.

In this mode the user may store any voice greeting, such as "Hello", in male or female voice. The greeting is stored as a compressed or uncompressed digitized speech pattern. Its duration is preferably between 1 and 15 secs. If it is necessary to store a voice greeting of longer duration, it is conceivable that a carkit memory 14, with more storage space, can be used for the database 46.

It is conceivable that the pre-programming in the initialization mode may be attempted several times, to train the phone to store the greeting in a form that can be easily reproduced and accurately recognized. For this purpose, the user can specify a location for the greeting in database 46, so that the user's previous greeting can be overwritten in the same location. Since it is possible that the mobile telephone has restricted access mode capability, the user is allowed to enter a password, which may be verified before allowing the user to store the voice greeting.

Figure 4:
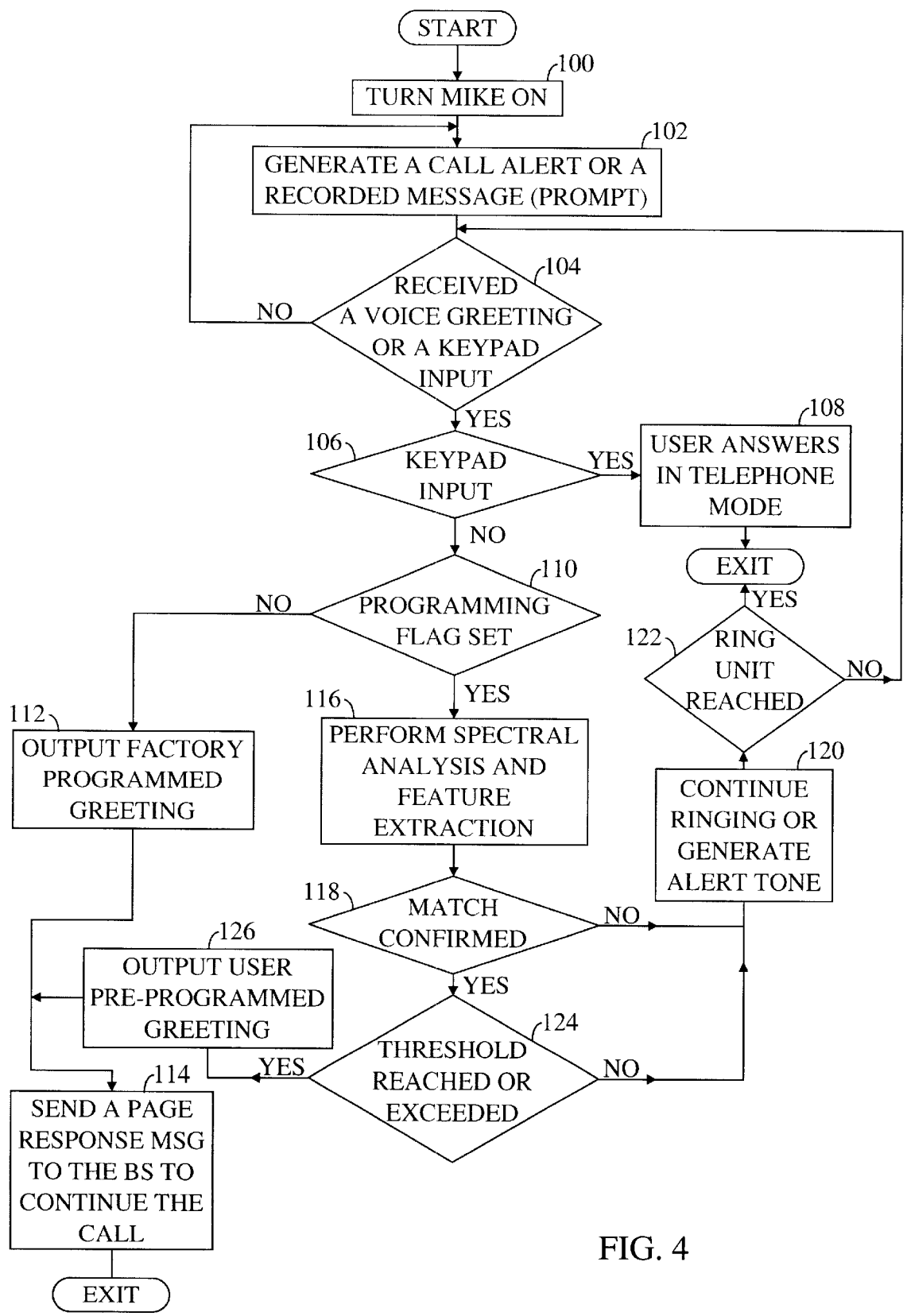
FIG. 4 illustrates a flow chart of a method allowing the user to answer the incoming call by voice activation, without pressing any keys of the keypad, according to yet another embodiment of the present invention.

The call answering method of the present invention is performed by a computer program stored in the software storage area 48. FIG. 4 is a flow chart of the program for implementing the call answering method, for allowing the user to answer the incoming call by voice activation without pressing any keypad key. The call answering mode has two aspects. In one aspect it provides a choice of answering the incoming call with a factory-programmed greeting. In another aspect the user's own voice greeting can be used, if previously pre-programmed according to the method of FIG. 3 and stored in the memory database 46.

Step 100 includes turning on the microphone 24, when the incoming call is received. Step 102 includes generating a call alert tone or a voice prompt to alert the user to enter a voice greeting or press a keypad 23 key. Step 104 includes waiting for the user's voice greeting or an input through the mobile telephone keypad 23, after each alert tone or generated ring. The incoming calls may be answered either in telephone mode, when any keypad 23 key is pressed, or answered/rejected in the voice greeting mode (i.e. the "carkit mode").

In the telephone mode, the stored verbal greeting may be disabled through the mobile telephone keypad 23, to allow the user to answer the telephone by pressing the mobile telephone to the user's ear, in noisy environments such as in the city. Therefore, if it is determined in step 106 that any keypad 23 key is pressed, the stored greeting is disabled and the user answers in telephone mode in step 108.

The voice greeting (or ear kit) mode allows the user to answer or reject an incoming call through voice commands (e.g. "hello", or "answer" etc.) If the user's voice greeting is received in step 104, and if in step 110 it is determined that the programmed status flag is not set by the method of FIG. 3, then the factory-programmed greeting is output on the carkit speaker 12. The factory-programmed greeting may be in male or female voice, and in the language of the country where the telephone was sold, but it is limited to only one greeting, such as "hello". Next, in step 114 a page response message is sent to the mobile telephone's base station and the user continues with the call without using the hands.

If the user's voice greeting is received in step 104, and in step 110 if it is determined that the programmed status flag is set to show that there is at least one existing greeting stored in the memory database 46, then the method continues with step 116. In step 116 the user's greeting is entered in the spectral analyzer 36 and feature extraction module 38, to attempt matching with all stored pre-programmed digitized speech patterns in the database 46. If a match is not confirmed in step 118, the call alert tone or voice prompts are generated in step 120. It is determined in step 122 whether the number of alerts or prompts exceeds a pre-programmed limit. If the limit is not yet reached, the program continues with step 104 to await receipt of another voice greeting or the keypad 23 input. The user can deliberately reject the incoming call by saying a greeting different from all the greetings stored in the database 46.

If a match is confirmed in step 118, step 124 checks whether the input voice greeting reaches a pre-programmed pass/fail voice threshold level. If the voice greeting is below the voice threshold, the telephone continues ringing or generates alert tones in step 120. If the threshold is reached or exceeded, the user pre-programmed greeting is output on the carkit speaker 12 in step 126. Next, step 114 is executed to send the page response message to the base station and the user continues with the call.

In the present invention the mobile telephone is in receiving mode while awaiting the calls. The telephone in receiving mode may be in any of three states: traffic, idle and acquisition state. To originate, terminate or establish a call the base station sends commands to the mobile telephone to enter the traffic state through assigning a traffic channel. In idle state the call is awaited for in a paging channel. In acquisition state the mobile telephone is awaiting to acquire initial system synchronization through frequency and phase tracking in order to establish a link to a base station (such as during a "handoff"). The mobile telephone ringing or alert tone generation can be performed in idle or traffic state. The ringing is enabled in the traffic state so that the mobile telephone user does not miss an incoming call during the handoff.

The preferred embodiments of the present invention may be used in any type of cellular network, and can provide the user with call answering of analog or digital mobile telephones by hands-free voice activation, in telephone or carkit mode.

While this invention has been described with reference to its presently preferred embodiments, its scope is only limited insofar as defined by the following set of claims and all equivalents thereof. It is quite clear that the above description has been given purely by way of a non-restrictive example. Those skilled in the art will appreciate that various adaptations and modifications of the described preferred embodiments can be configured without departing from the scope and spirit of the invention. Therefore, it is to be understood that, within the scope of the appended claims, the invention may be practiced otherwise than as specifically described herein.

What is claimed is:

1. A method for allowing a mobile telephone user to answer an incoming call by a verbal command to perform hands-free voice activation, comprising the steps of:

if not previously initialized, performing initialization to pre-program a user's voice greeting; and if an incoming call is received, answering the incoming call by a verbal command to accept or reject the incoming call, wherein the answering the incoming call step further comprises the steps of:

alerting the user to enter a verbal command;

waiting for the user's verbal command; and if the user answered by the verbal command and if not previously initialized, outputting a factory-programmed voice greeting; or if the user answered by the verbal command and if previously initialized, determining if a match found of the user's verbal command and the stored user pre-programmed voice greetings, and if a match is found, outputting the matched user pre-programmed voice greeting.

2. The method of claim 1 wherein the initialization step further comprises the steps of:

prompting the user for, and inputting, the user's voice greeting;

prompting the user for, and entering, a mobile telephone memory database location for storing the voice greeting; and storing the voice greeting represented as a digitized speech pattern in the specified mobile telephone memory database location.

3. The method of claim 2 wherein the digitized speech pattern may be in compressed or uncompressed form.

4. The method of claim 2 wherein the initialization step further comprises the steps of:

entering a password; and verifying the password before allowing the user to store the voice greeting.

5. The method of claim 1 including the further step of, sending a page response message to the mobile telephone's base station to continue with the incoming call.

6. A method for answering a mobile telephone incoming call by a verbal command, to allow hands-free voice activation of the mobile telephone placed on a carkit, comprising the steps of:

waiting until an incoming call is received;

alerting the user to enter a voice greeting or press the mobile telephone keypad key, after receipt of the incoming call;

waiting for the user's voice greeting or an input through the mobile telephone keypad;

if any keypad key is pressed, answering the call in telephone mode;

if the user answered by a voice greeting, answering the call in carkit mode; and sending a page response message to the mobile telephone's base station to continue with the incoming call, wherein the step of answering the call in carkit mode comprised outputting the preprogrammed voice greeting on the mobile telephone carkit speaker.

7. The method of claim 6 wherein the step of answering the call in carkit mode further comprises a step of choosing a factory-programmed voice greeting or the user's pre-programmed voice greeting, if previously initialized.

8. The method of claim 7 wherein the step of choosing the user's pre-programmed voice greeting further comprises a step of determining if a match is found between the user's voice greeting and the stored user pre-programmed voice greetings, and if a match is found, outputting the matched user pre-programmed voice greeting.

9. The method of claim 7 wherein the voice greeting is represented as a digitized speech pattern, in compressed or uncompressed form.

10. The method of claim 8 wherein the step of waiting for an incoming call further comprises the step of:

if an incoming call is not received and not previously initialized, performing initialization to pre-program the user's voice greeting.

11. The method of claim 10 wherein the initialization step comprises the steps of:

prompting the user and inputting the user's voice greeting;

prompting the user and entering a mobile telephone memory database location for storing the voice greeting; and storing the voice greeting represented as a digitized speech pattern in the specified mobile telephone memory database location.

12. The method of claim 11 wherein the initialization step further comprises the steps of:

entering a password; and verifying the password before allowing the user to store the voice greeting.

13. A mobile telephone system for answering a mobile telephone incoming call by a user's verbal command, to allow hands-free voice activation, comprising:

a mobile telephone having:

a programming key for pre-programming the user's voice greeting, a keypad means for answering the call in telephone mode, a microphone means for receiving and entering a user's verbal command when answering the call in carkit mode, a digital processing means connected to the microphone means for performing spectrum analysis and feature extractions of the user's verbal command in carkit mode, and a memory means connected to the digital processing means and having a database for storing the user's pre-programmed voice greeting digitized speech pattern; and a carkit having a cradle for holding the mobile telephone and a speaker for outputting the pre-programmed voice greeting.

14. The system of claim 13 wherein the pre-programmed voice greeting comprises a factory-programmed voice greeting and the user's pre-programmed voice greeting, if previously initialized after pressing the programming key.

15. The system of claim 13 wherein the voice greeting digitized speech pattern is stored in compressed or uncompressed form.

16. The system of claim 13 wherein the digital processing means comprises a spectrum analyzer means for performing spectrum analysis and a feature extraction means for feature extractions of the user's verbal command for determining if a match exists between the user's verbal command and the stored user pre-programmed voice greetings.

17. The system of claim 16 wherein the digital processing means comprises means for checking whether the user's verbal command reaches a pre-programmed pass/fail voice threshold level, If the match is confirmed.

* * * * *